United States Patent
Barnett

(10) Patent No.: US 6,216,009 B1
(45) Date of Patent: Apr. 10, 2001

(54) METHOD AND APPARATUS FOR RESOLVING MULTIPLE CALL ACCESSES IN A WIRELESS COMMUNICATION SYSTEM

(75) Inventor: Charles Barnett, Sterling, VA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/838,586

(22) Filed: Apr. 10, 1997

(51) Int. Cl.[7] ...................................... H04B 7/00
(52) U.S. Cl. ........................ 455/510; 455/515; 455/453
(58) Field of Search .................................. 455/510, 515, 455/517, 434, 424, 439, 450, 509, 522, 447, 446, 453, 513, 514, 437

(56) References Cited

U.S. PATENT DOCUMENTS

| | | | |
|---|---|---|---|
| 4,144,411 | * | 3/1979 | Frenkiel .............................. 455/447 |
| 4,670,899 | * | 6/1987 | Brody et al. ......................... 455/453 |
| 5,203,011 | * | 4/1993 | Bane et al. .......................... 455/510 |
| 5,293,641 | * | 3/1994 | Kallin et al. ........................ 455/510 |
| 5,345,596 | * | 9/1994 | Buchenhorner ...................... 455/450 |
| 5,355,516 | * | 10/1994 | Herold et al. ....................... 455/510 |
| 5,396,648 | * | 3/1995 | Patsiokas et al. ................... 455/515 |
| 5,559,866 | * | 9/1996 | O'Neill ............................... 455/447 |
| 5,561,847 | * | 10/1996 | Kataoka ............................. 455/509 |
| 5,613,208 | * | 3/1997 | Blackman et al. .................. 455/434 |
| 5,687,171 | * | 11/1997 | Shin et al. .......................... 455/509 |
| 5,946,612 | * | 8/1999 | Johansson .......................... 455/446 |

* cited by examiner

Primary Examiner—Dwayne D. Bost
Assistant Examiner—Quochien Vuong
(74) Attorney, Agent, or Firm—John T. Whelan; Michael W. Sales

(57) ABSTRACT

A base transceiver station has a signal strength receiver and is capable of transmitting a directed retry signal. A processor connects to the signal strength receiver and compares a received signal strength to a predefined threshold. The processor causes the base transceiver station to send the directed retry signal if the received signal strength is less than the predefined threshold. A method is provided where a characteristic of a signal received at a base transceiver station is measured and compared to a predefined threshold. A directed retry is sent if the signal characteristic is less than the predefined threshold, and a communication channel is established if a response to the directed retry is received at the base transceiver station.

20 Claims, 2 Drawing Sheets

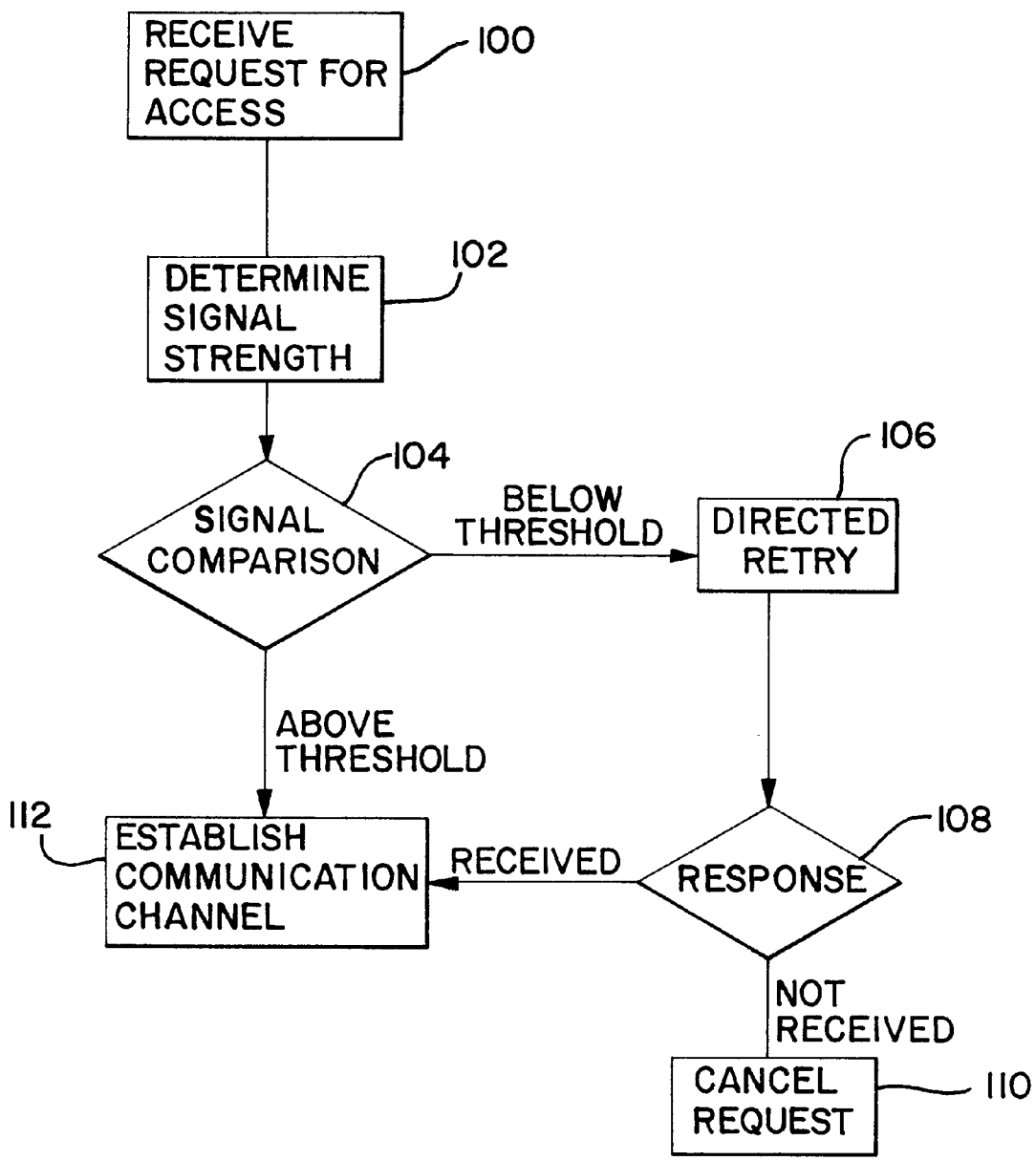

METHOD AND APPARATUS FOR RESOLVING MULTIPLE CALL ACCESSES IN A WIRELESS COMMUNICATION SYSTEM

BACKGROUND OF THE INVENTION

The present invention relates to wireless communications, and more particularly to a method and apparatus for providing access in a cellular communication system.

Wireless mobile telecommunications systems utilize radio signals to exchange information between base transceiver stations and mobile subscribers. Each base transceiver station transmits from an antenna throughout a predetermined area referred to as a cell. In order to provide service to mobile subscribers over a particular geographic region, many cells are positioned over the region or coverage area.

The service area of a cellular communication system is usually divided into cells of various sizes. Within each cell, a plurality of frequencies are allocated to communicate with a mobile subscriber. Each cell usually operates on a different subset of frequencies than neighboring cells to minimize the density of the used spectrum in a particular geographic area.

Because the frequency band allocated for telecommunications is limited, cellular systems may reuse the same frequencies at other cells. Reuse of the same frequencies may cause a mobile subscriber to access the cellular system at a number of cells having the same channel and digital color code. When a mobile subscriber accesses multiple cells, the call may be rejected or the mobile subscriber may receive a busy signal. Furthermore, multiple accesses usually result in resources being unnecessarily allocated to support "phantom" calls.

SUMMARY OF THE INVENTION

The present invention provides an apparatus and method for resolving multiple call accesses in a cellular system. The present invention prevents a mobile subscriber from accessing the system at multiple cells. In one aspect of the invention, a base transceiver station is provided. The base transceiver station has a signal strength receiver and is capable of transmitting a directed retry signal. A processor connects to the signal strength receiver and compares a received signal strength to a predefined threshold. The processor causes the base transceiver station to send the directed retry signal if the received signal strength is less than the predefined threshold.

In another aspect of the invention, a characteristic of a signal received at a base transceiver station is measured and compared to a predefined threshold. A directed retry is sent if the signal characteristic is less than the predefined threshold, and a communication channel is established if a response to the directed retry is received at the base transceiver station.

In another aspect of the invention, a cellular system capable of resolving multiple cell access requests is provided, comprising at least a first and second base transceiver station. Each base transceiver station has a signal strength receiver and a base station controller. The base station controllers have received signal strength thresholds. A first request for access signal is received at both base transceiver stations. The base transceiver stations both measure the signal strength of the first request for access signal and the signal strength at the first base transceiver station is below the received signal strength threshold for that base transceiver station. The first base transceiver station sends a directed retry signal. A communication channel with the first base transceiver station is established if a response to the directed retry is received by the first base transceiver station.

In yet another aspect of the invention, a first request for access signal is received at both a first and second base transceiver station. The first base transceiver station transmits a directed retry signal if the first signal strength of the first request for access is below a first received signal strength threshold, and the second base transceiver station establishes a communication channel if the second signal strength of the first request for access is above a second received signal strength threshold.

It is to be understood that both the foregoing general description and the following detailed description are exemplary and explanatory and are intended to provide further explanation of the invention as claimed.

The invention, together with further objects and attendant advantages, will best be understood by reference to the following detailed description of the presently preferred embodiment of the invention, taken in conjunction with the accompanying drawings.

BRIEF DESCRIPTION OF THE DRAWINGS

FIG. 4 is a block diagram of a scheme for resolving multiple call accesses in a cellular system in accordance with the present invention.

DETAILED DESCRIPTION OF THE PREFERRED EMBODIMENT

Figure 1:
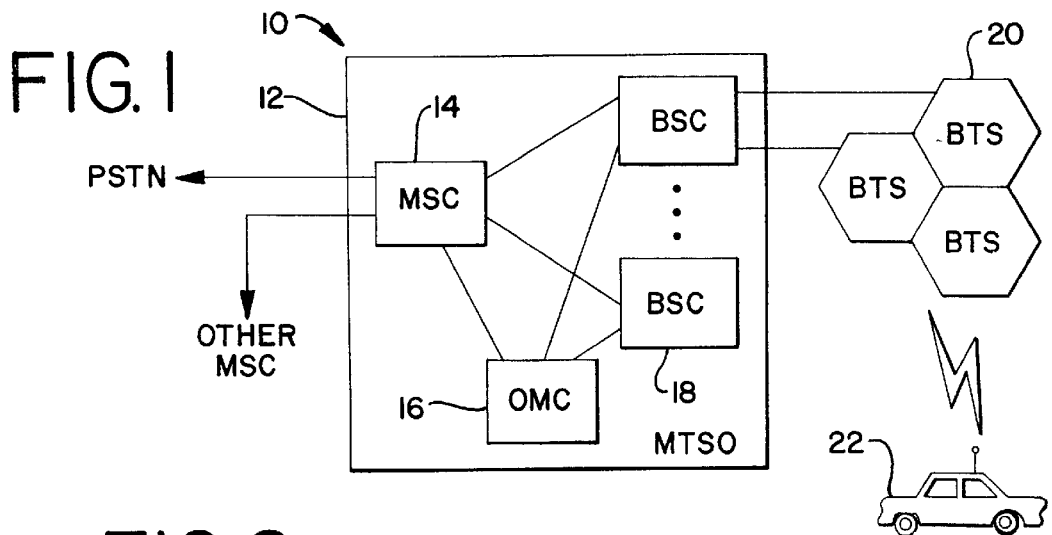
FIG. 1 is a block diagram of a digital cellular network.

Referring now to the drawings, and more particularly to FIG. 1, a preferred embodiment of a cellular network 10 is illustrated. The cellular network 10 may be utilized to implement the method and apparatus of the present invention. The cellular network 10 preferably determines the strength of an access request by a mobile subscriber. When the access request is less than a predefined threshold, a direct retry is sent to the mobile subscriber. If the mobile subscriber responds, service is provided. The direct retry allows the cellular system to perform more efficiently by reducing the amount of resources for setting up a call.

In a preferred embodiment, the cellular network 10 includes at least one base transceiver station (BTS) 20, at least one mobile subscriber 22, and a mobile telephone switching office (MTSO) 12. The MTSO 12 includes a mobile switching center (MSC) 14, an operations and maintenance center (OMC) 16, and a plurality of base station controllers (BSCs) 18. The MTSO 12 is in communication with a terrestrial telephony carrier, such as the public switched telephone network (PSTN), and may also communicate with satellite systems and other mobile switching centers.

The MSC 14 is in communication with the OMC 16, and is also in communication with at least one BSC 18. The BSC 18 is connected through a communication channel to one or more of the base transceiver stations (BTS) 20. Each BTS 20 includes an antenna (not shown) and defines an individual cell of the cellular network 10. Each BTS 20 includes hardware and software required to communicate over the channels of the cellular system 10. Each BTS also includes a plurality of individual scanning receivers for scanning selected traffic channels and includes digital multiplex equipment for transmission of audio traffic to its associated BSC 18.

A mobile subscriber 22 may communicate over a control channel with a BTS of a particular cell in which it is located. The mobile subscriber 22 is preferably either a hand held phone or a vehicle mounted unit. It is also contemplated that the mobile subscriber 22 may include fixed terminals. The mobile subscriber 22 may also include a scanning receiver for scanning selected channels of the serving and neighboring cell.

A call may be originated from the mobile subscriber 22 by transmitting initialization data over the control channel assigned to the BTS 20 serving the mobile subscriber 22. Preferably, control channel signals are received in a time slot within a predetermined frequency assigned to the cell. From the BTS 20, the call is routed to the BSC 18, and then to the MSC 14. From the MSC 14, the call is routed outside of the MTSO 12 to either another MSC or the PSTN. Thereafter, a communication channel is established through the entire digital cellular network 10, and the mobile subscriber 22 may communicate over the established communication channel. The communication channel comprises a pair of frequencies. The slot pair of frequencies for a communications channel may be in a time division multiple access format.

The mobile subscriber 22 may also receive calls originating from a terrestrial facility, such as the PSTN or another MSC, by connecting the call through the system 10 at the MSC 14. From the MSC 14, the call is routed to one of the BSCs 18. The BSC 18 then sends a message to the mobile subscriber 22 via the appropriate BTS 20 to announce the incoming call. After the mobile subscriber 22 responds to the page from the BTS 20, a communication channel is established.

Figure 2:
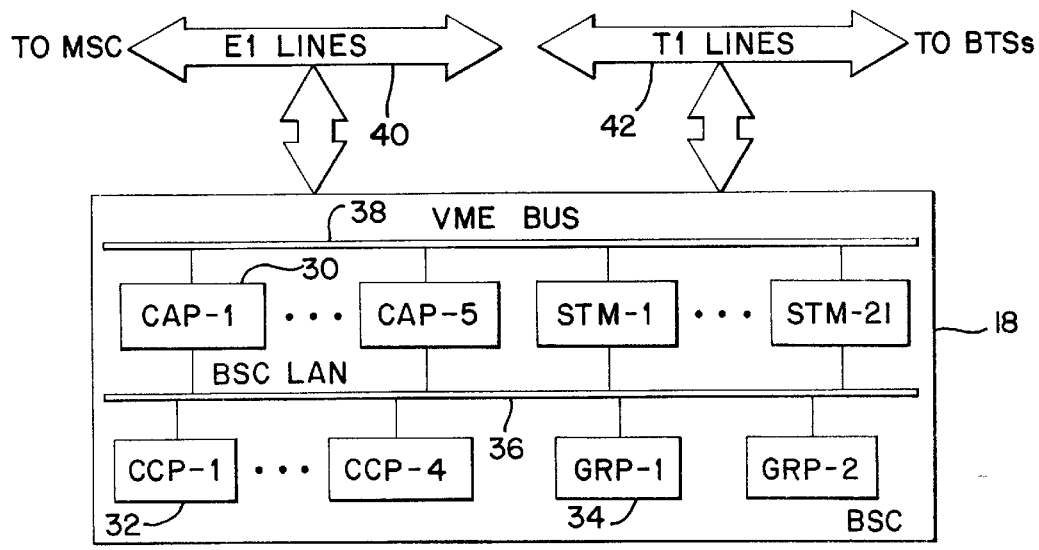
FIG. 2 is a block diagram of the base station controller of FIG. 1.

Referring to FIG. 2, a preferred component layout for the BSC 18 is illustrated. The BSC 18 preferably implements audio compression/decompression and handles call establishment, disconnect, and handoff procedures. The BSC 18 also allocates system resources of the BTS 18 associated with a particular BSC 18. The BSC 18 communicates with the MSC 14 over E1 transmission lines 40, and communicates with the BTS 20 over T1 transmission lines 42. The BSC 18 also communicates with the OMC 16.

Preferably, the BSC 18 has several processors including a global resource processor (GRP) 34, a call control processor (CCP) 32, and a channel access processor (CAP) 30. The BSC 18 also includes a BSC local area network (LAN) 36 and a VME bus 38. The VME bus 38 is used to communicate between the various CAPs 30, while the BSC LAN 36 allows communication between the CCPs 32.

The CAP 30, CCP 32, and GRP 34 shown in FIG. 2 are preferably 32 bit microprocessors, such as an Intel 960. The processors (30, 32, and 34) are preferably operated with a multi-tasking software operating system such as UNIX or the VX WORKS operating system available from Wind River Systems. The processors (30, 32, and 34) are also usually programmed with application software and communication software. Preferably, the software is written in C language or another conventional high level programming language. Each of the processors (30, 32, and 34) communicates with the other processors using either the BSC LAN 36 or the VME bus 38. Preferably, the processors (30, 32, and 34) communicate with each other using a network configuration and communication techniques well-known in the art.

Calls originating from the mobile subscriber 22 are received over the T1 line 42 and processed by the GRP 34. The GRP 34 then determines, based on loading conditions, which CCP 32 should handle the call. The call is then handed off to the selected CCP 32 assigned to the call. The CCP 32 then determines which CAP 30 should be used. In the case of a call originating from the PSTN or another MSC, the call is received by the MSC 14 and is then routed to a GRP 34 over an E1 line 40. The GRP 34 allocates a CCP 32, which then allocates a CAP 30.

Figure 3:
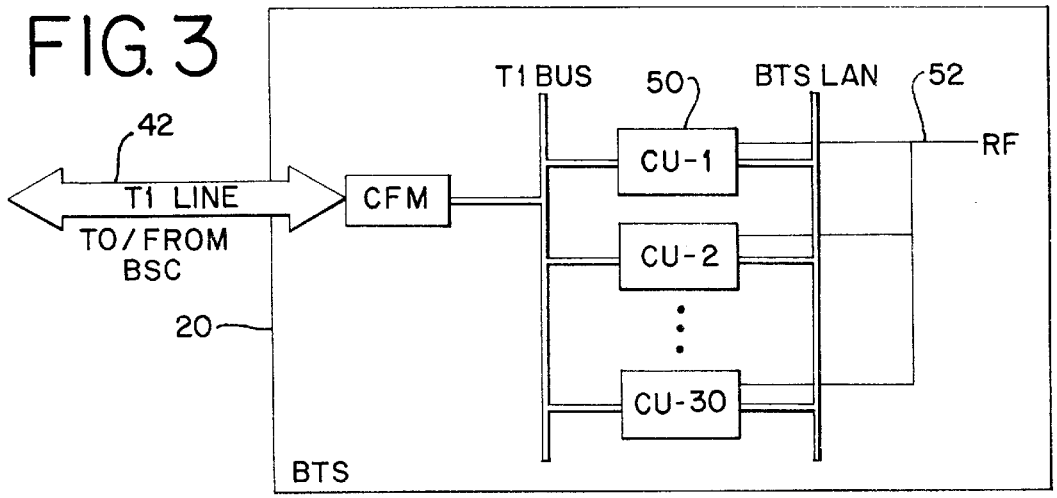
FIG. 3 is a block diagram of the base transceiver station of FIG. 2.

Referring to FIG. 3, a block diagram of a preferred component layout for the BTS 20 is illustrated. The BTS 20 communicates with the BSC 18 over T1 communication lines 42. A channel unit (CU) 50 receives data from the T1 lines 42 and generates a signal to be sent over a communication link 52. The communication link 52 is used to communicate with the mobile subscriber 22 in a cell (not shown) via a radio frequency signal transmission.

The CU 50 is preferably either an analog channel unit, a dual mode channel unit, or a digital channel unit. Each CU 50 contains a plurality of communication channels available for transmissions. These channels may be analog control channels, analog traffic channels, digital traffic channels, analog scanning receiver channels, or digital scanning receiver channels. The control channels are used to communicate between the BTS 20 and the mobile unit 22 before the mobile unit 22 has been assigned a voice channel for communication. An analog traffic channel may be used for voice communication between the BTS 20 and the mobile subscriber 22. Each analog traffic channel is associated with a specific predefined frequency used for radio transmission over the communication link 52. The allocation of frequencies to traffic channels is defined in detail by U.S. Cellular Standard IS-54. Alternatively, in a digital communication system, a digital traffic channel may be used instead of the analog traffic channel.

Each CU 50 includes its own processor, such as an Intel 960 32-bit microprocessor unit, along with a hardware circuit for transmitting information over each of the channels. Each CU 50 communicates with other CUs 50 in the same BTS 20 over the BTS LAN 36.

In a preferred embodiment, the mobile subscriber 22 employs a time division multiple access (TDMA) method of communicating digital information to the BTS 20. The formatted information transmitted from the mobile subscriber 22 to the BTS 20 is arranged in frames having time slots. Preferably, there are six time slots. The mobile subscriber 22 broadcasts information onto one of the time slots in transmission bursts. The transmission bursts are synchronized to correspond with the appropriate time slot reserved for the particular transmission. The transmission bursts are separated by an inter-burst guard time to avoid interference between bursts.

The cells of the cellular network are preferably color coded by a two bit symbol, called the digital color code (DCC), assigned to the control channels. The DCC assists the cellular network to manage frequency or time slot assignment of clusters of cells.

Referring to FIG. 4, a preferred embodiment of a scheme for accessing a cellular communication system is shown. When a call is originated by the mobile subscriber 22, it will send out a signal over a particular control channel. The signal may be received by multiple base stations having the same channel and DCC 100. In order for the appropriate cell of the system to be assigned to the mobile subscriber 22, the BTS 20 of the cell determines 102 the strength of the signal transmitted from the mobile subscriber 22.

The BTS 20 is preferably equipped with a signal strength receiver to measure the signal strength of a mobile subscriber. The signal strength of the mobile subscriber 22 is compared to a predetermined threshold value 104. Preferably, the threshold value is above a value determined from the size of the cell and the co-channel access level. If the signal is below the predetermined threshold value, the BSC 18 requests (106) the mobile subscriber 22 to again access the BSC 18. This request is referred to as a directed retry. If the mobile subscriber 22 does not respond 108 to the directed retry message sent from the BSC 18, the communication access request will be canceled 110. For the mobile subscriber 22 to respond, the mobile subscriber 22 will send a signal to the BSC 18. Preferably, the signal will contain information indicating that the mobile subscriber 22 previously attempted to access the BSC 18. After the directed retry and a response 108, the BSC 18 will then process the call and a communication channel will be set up (112) at the BTS 20.

The present invention preferably prevents a mobile subscriber 22 from accessing the cellular communication system in multiple cells. For example, if a mobile subscriber 22 attempts to originate a call and the call is received by multiple cells with the same channel and DCC, the BTS 20 of each cell will compare the signal strength from the mobile subscriber 22 with the predetermined threshold value. In one of the cells, the signal from the mobile subscriber 22 will usually be above the predetermined threshold value and access will be allowed by the BTS 20. In the other cells, the signal from the mobile subscriber will usually be below the predetermined threshold valve and a directed retry will be sent by the BTS 20. However, the mobile subscriber will not respond because the mobile subscriber will be tuned to BTS 20 of the cell where the signal was greater than the predetermined value.

Although the present invention has been described in detail by way of illustration and example, it should be understood that a wide range of changes and modifications can be made to the preferred embodiment described above without departing in any way from the scope and spirit of the invention. Furthermore, the described embodiments are to be considered in all respects only as illustrative and not restrictive, and the scope of the invention is, therefore, indicated by the appended claims rather than the foregoing description.

What is claimed is:

1. A method of resolving multiple cell accesses in a cellular system comprising the steps of:
   receiving a signal at a base transceiver station;
   measuring a characteristic of the signal;
   comparing the signal characteristic to a predefined threshold associated with cell size and co-channel access level;
   sending a request to send another signal if the signal characteristic is less than the predefined threshold; and
   automatically establishing a communication channel if a response to the request is received at the base transceiver station.

2. The method of claim 1 further comprising the step of establishing a communication channel if the signal characteristic is greater than the predefined threshold.

3. The method of claim 1 wherein the step of receiving a signal comprises receiving a request for a communication channel signal.

4. The method of claim 3 further comprising the step of canceling the request for the communication channel if the response is not received at the base transceiver station.

5. The method of claim 1 wherein the step of automatically establishing a communication channel if a response is received at the base transceiver station comprises automatically establishing the communication channel if the response is received at the base transceiver station, said response indicating that the signal was previously sent.

6. The method of claim 1 wherein the step of receiving a signal at a base transceiver station comprises receiving the signal over a control channel at the base transceiver station, the base transceiver having a specific identification code.

7. The method of claim 1 wherein the step of establishing a communication channel comprises establishing an analog transmission frequency pair.

8. The method of claim 1 wherein the step of measuring a characteristic of the signal comprises measuring the received signal strength.

9. An apparatus for resolving multiple cell accesses in a cellular communication system comprising:
   a base transceiver station comprising a signal strength receiver, the base transceiver station capable of transmitting a request to send another signal;
   a processor operatively connected to the signal strength receiver, the processor comparing a received signal strength to a predefined threshold associated with cell size and co-channel access level and causing the base station transceiver to send the request if the received signal strength is less than the predefined threshold; and
   a communication channel which is automatically established if the base transceiver station receives a response to the request.

10. The apparatus of claim 9 wherein the communication channel comprises an analog frequency pair in a TDMA system.

11. The apparatus of claim 9 wherein the response comprises a second request for access and data indicating a previous request for access.

12. The apparatus of claim 9 wherein the received signal strength comprises a measurement of a first request for access received on a control channel.

13. The apparatus of claim 12 wherein the request to send another signal comprises an instruction to make a second request for access.

14. The apparatus of claim 13 wherein the instruction to make the second request for access comprises a signal addressed to a mobile unit that made the first request for access.

15. The apparatus of claim 14 wherein the response comprises the second request for access.

16. The apparatus of claim 9 wherein the processor comprises a base station controller.

17. A cellular system capable of resolving multiple cell access requests comprising:
   at least a first and second base transceiver station, each base transceiver station having a signal strength receiver;
   at least a first and second base station controller operatively connected to the first and second base transceiver stations, respectively, the first and second base station controllers having a first and second received signal strength threshold associated with cell size and co-channel access level, respectively;
   a first request for access signal received at both the first and second base transceiver stations;
   first and second signal strength of the first request for access signal at the first and second base transceiver station, respectively, the first signal strength being below the firs received signal threshold;

a request to send another signal communicated by the first base transceiver station; and a communication channel with the first base transceiver station which is automatically established if a response to the request to send another signal is received by the first base transceiver station.

18. The apparatus of claim 17 wherein the first and second base transceiver stations comprise the identification code.

19. A method of resolving multiple cell access requests in a cellular communication system comprising the steps of:

receiving a first request for access signal at both a first and second base transceiver station;

transmitting a request to send another signal from the first base transceiver station if a first signal strength of the first request for access at the first base transceiver station comprises a level below a first received signal strength threshold associated with cell size and co-channel access level; and automatically establishing a communication channel at the second base transceiver station if a second signal strength of the first request for access at the second base transceiver station comprises a level above a second received signal strength threshold associated with cell size.

20. The method of claim 19 comprising the further step of establishing a communication channel at the first base transceiver station upon receipt of a response to the request to send another signal.

* * * * *